US011966248B2

(12) United States Patent
Ishihara et al.

(10) Patent No.: US 11,966,248 B2
(45) Date of Patent: Apr. 23, 2024

(54) OPERATION DEVICE

(71) Applicant: KABUSHIKI KAISHA TOKAI RIKA DENKI SEISAKUSHO, Aichi (JP)

(72) Inventors: Akito Ishihara, Aichi (JP); Yuki Sakai, Aichi (JP); Yosuke Naito, Aichi (JP); Renya Watanabe, Aichi (JP); Yutaka Okuda, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 18/179,888

(22) Filed: Mar. 7, 2023

(65) Prior Publication Data

US 2023/0297129 A1 Sep. 21, 2023

(30) Foreign Application Priority Data

Mar. 15, 2022 (JP) ................................ 2022-040799

(51) Int. Cl.
*G05G 1/02* (2006.01)
*H01H 3/02* (2006.01)

(52) U.S. Cl.
CPC ................ *G05G 1/02* (2013.01); *H01H 3/02* (2013.01); *H01H 2003/028* (2013.01); *H01H 2003/0293* (2013.01)

(58) Field of Classification Search
CPC ...... G05G 1/02; H01H 3/02; H01H 2003/028; H01H 2003/0293; H01H 2235/004; H01H 13/00; H01H 13/14; H01H 13/20; H01H 13/28; H01H 13/50; H01H 13/52; H01H 13/70; H01H 13/7065; H01H 2221/058; H01H 3/00; H01H 3/04; H01H 3/06; H01H 3/12; H01H 3/122; H01H 3/125; H01H 3/32; H01H 3/46; H01H 2221/00; H01H 2221/05
USPC ........................................................ 200/341
See application file for complete search history.

(56) References Cited

U.S. PATENT DOCUMENTS 8,188,387 B2 * 5/2012 Lo ......................... H01H 3/122
200/5 A

FOREIGN PATENT DOCUMENTS

JP 2005-011746 A 1/2005

* cited by examiner

*Primary Examiner* — Anthony R Jimenez
(74) *Attorney, Agent, or Firm* — Studebaker & Brackett PC

(57) ABSTRACT

An operation device includes an operating portion to receive a push-in operation, a lessening member to lessen tilt movement of the operating portion associated with the push-in operation, a supporting portion to support the lessening member, a base portion on which the supporting portion is provided, and at least one placement portion that is provided on the base portion, includes a placing surface to place an end portion of the lessening member, and holds the lessening member on the base portion by the placing surface and the supporting portion in a preparation stage for assembling the operating portion to the base portion.

8 Claims, 7 Drawing Sheets

OPERATION DEVICE

CROSS REFERENCE TO RELATED APPLICATIONS

The present patent application claims the priority of Japanese patent application No. 2022/040799 filed on Mar. 15, 2022, and the entire contents of Japanese patent application No. 2022/040799 are hereby incorporated by reference.

TECHNICAL FIELD

The present invention relates to an operation device.

BACKGROUND ART

A push button switch is known which includes a push button, an escutcheon with a hole to insert the push button, a substrate attached to the back side of the escutcheon and having upper and lower elastic-force applying portions to elastically press the push button from the back surface side toward the front surface side and an electrical switch unit, and a stabilizer attached in a swingable manner between the push button and the escutcheon (see, e.g., Patent Literature 1).

The stabilizer is configured such that a linear locking portion and two arm portions bent 90 degrees from both ends of the locking portion form a squared U-shape and two engagement portions are also provided so as to be bent 90 degrees respectively from ends of these arm portions and extend in directions parallel to the locking portion as well as away from each other. The stabilizer suppresses tilt movement of the push button since it supports the push button from its left and right while keeping its posture so that the two engagement portions are always aligned in a straight line.

CITATION LIST

Patent Literature

Patent Literature 1: JP 2005/11746 A

SUMMARY OF THE INVENTION

Since the stabilizer suppresses, e.g., movement of the push button in a tilted state by an elastic force, there is a problem that a jig to hold the stabilizer against this elastic force is required when attaching the stabilizer and it thus takes time and effort.

It is an object of the invention to provide an operation device that is easy to assemble.

An aspect of the invention provides an operation device, comprising:

- an operating portion to receive a push-in operation;
- a lessening member to lessen tilt movement of the operating portion associated with the push-in operation;
- a supporting portion to support the lessening member;
- a base portion on which the supporting portion is provided; and
- at least one placement portion that is provided on the base portion, comprises a placing surface to place an end portion of the lessening member, and holds the lessening member on the base portion by the placing surface and the supporting portion in a preparation stage for assembling the operating portion to the base portion.

Advantageous Effects of Invention

According to the invention, an operation device can be provided that is easy to assemble.

DETAILED DESCRIPTION OF THE INVENTION

Short Summary of the Embodiment

An operation device in the embodiment generally includes an operating portion to receive a push-in operation, a lessening member to lessen tilt movement of the operating portion associated with the push-in operation, a supporting portion to support the lessening member, a base portion on which the supporting portion is provided, and at least one placement portion that is provided on the base portion, comprises a placing surface to place an end portion of the lessening member, and holds the lessening member on the base portion by the placing surface and the supporting portion in a preparation stage for assembling the operating portion to the base portion.

Since the lessening member can be held on the base portion by means of the placing surface of the at least one placement portion and the supporting portion without having to hold the lessening member by a jig prior to assembly, this operation device is easier to assemble than when using a jig.

EMBODIMENT

General Configuration of an Operation Device 1

Figure 1A:
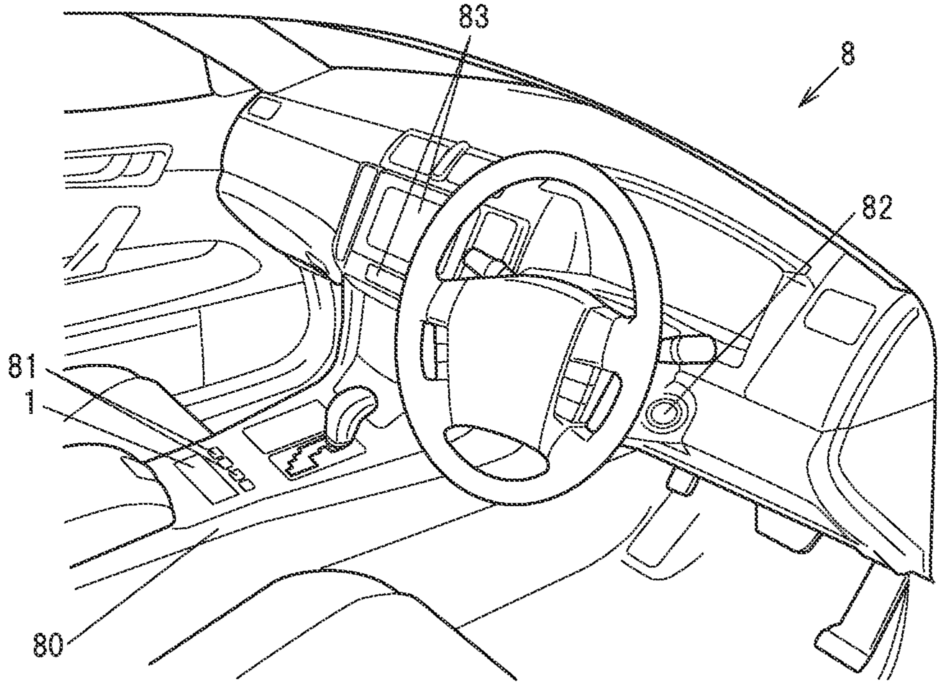
FIG. 1A is a diagram illustrating an example of the inside of a vehicle.
Figure 1B:
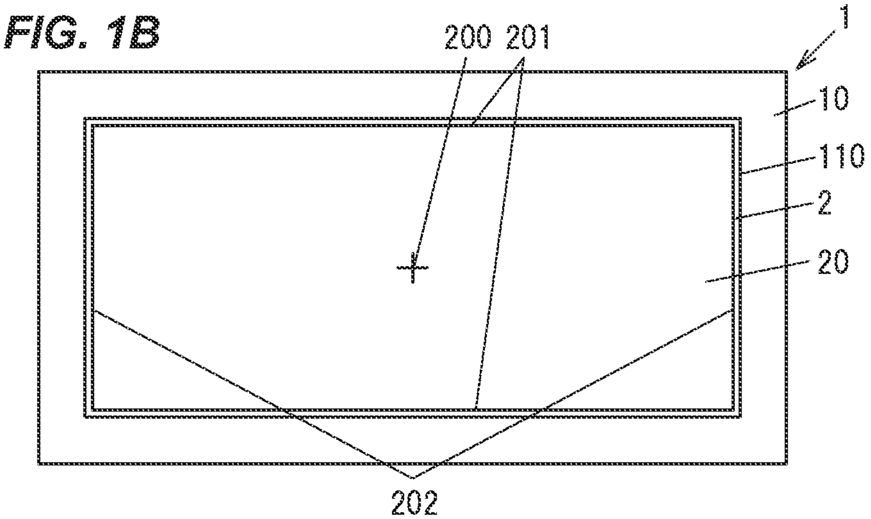
FIG. 1B is an example top view showing an operation device.
Figure 1C:
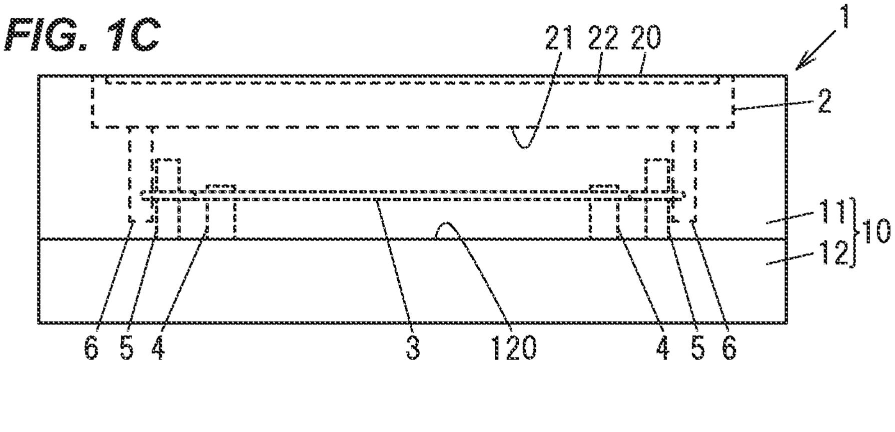
FIG. 1C is an example side view showing the operation device.
Figure 2A:
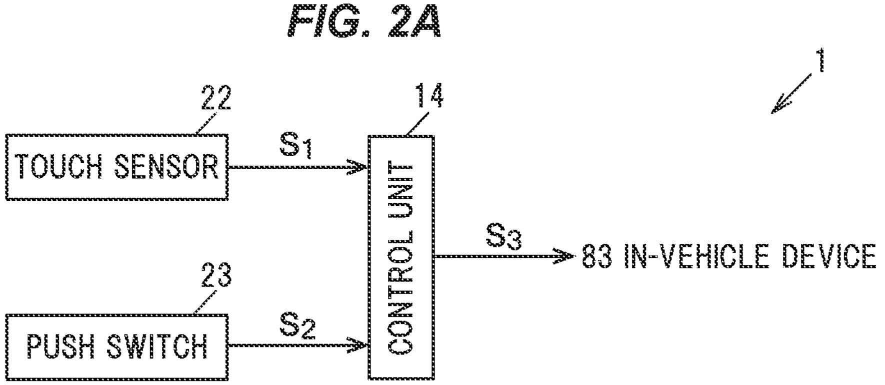
FIG. 2A is an example block diagram illustrating the operation device.
Figure 2B:
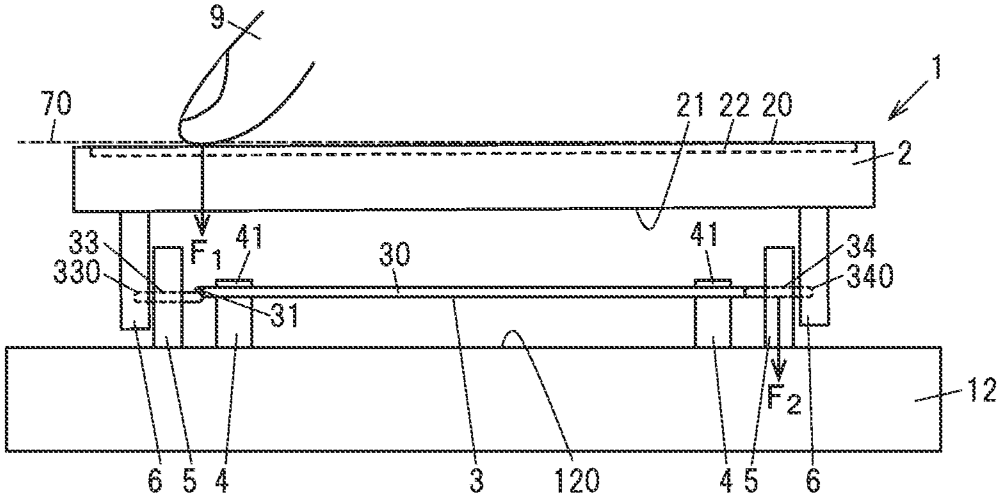
FIGS. 2B and 2C are explanatory diagrams illustrating an example of lessening action of a stabilizer.
Figure 2C:
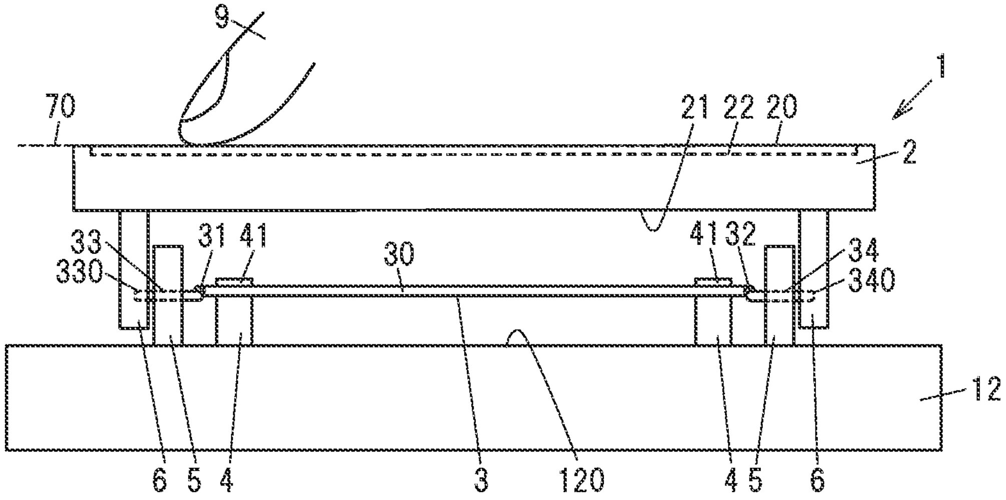
Figure 3A:
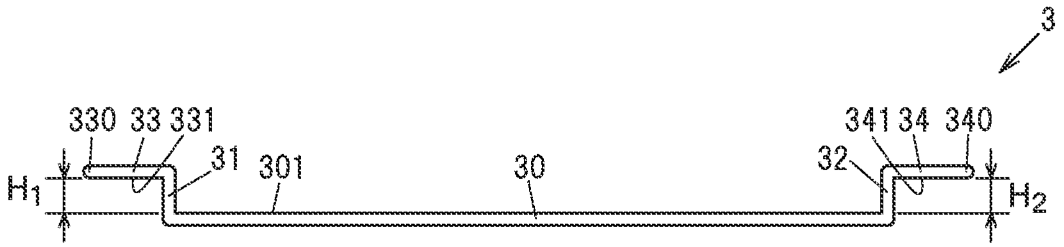
FIG. 3A is a diagram illustrating an example of the stabilizer.
Figure 3B:
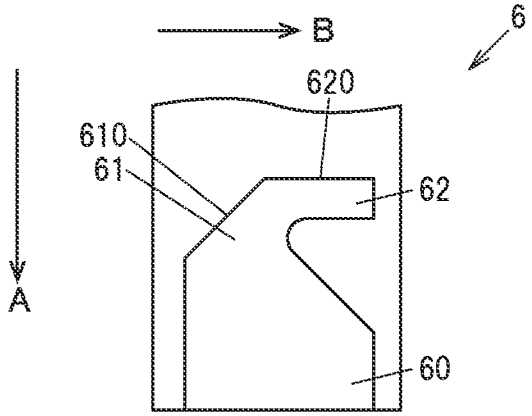
FIG. 3B is a diagram illustrating an example of a guide portion.
Figure 4A:
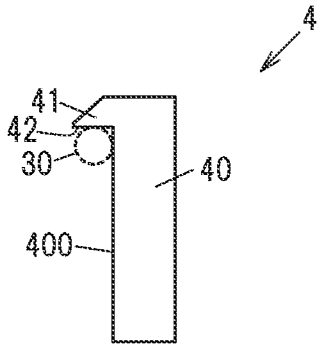
FIG. 4A is a diagram illustrating an example of a supporting portion.
Figure 4B:
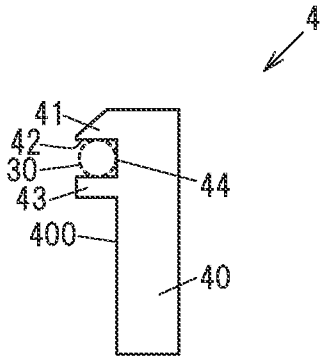
FIGS. 4B and 4C are diagrams illustrating examples of the supporting portion in modifications.
Figure 4C:
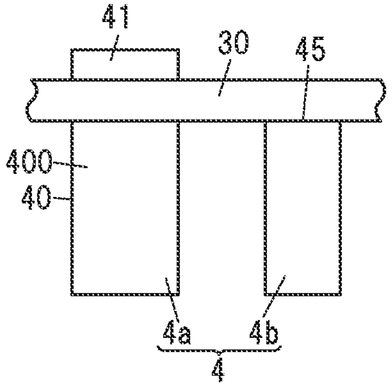
Figure 5A:
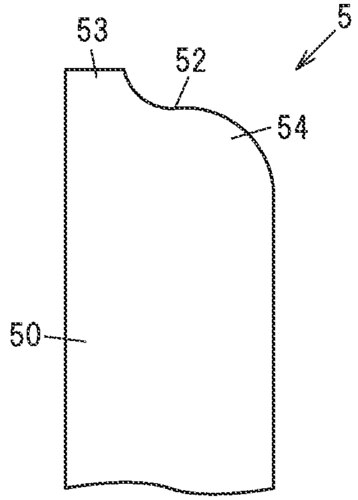
FIG. 5A is a diagram illustrating an example of a placement portion.
Figure 5B:
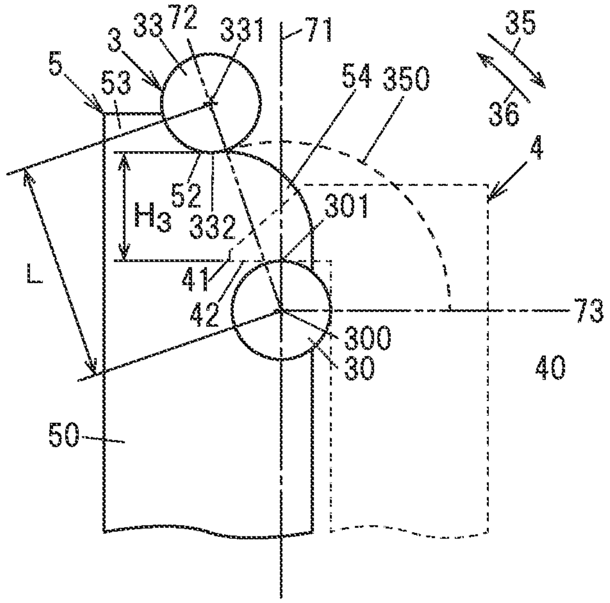
FIG. 5B is an explanatory diagram illustrating an example of a placing surface.
Figure 5C:
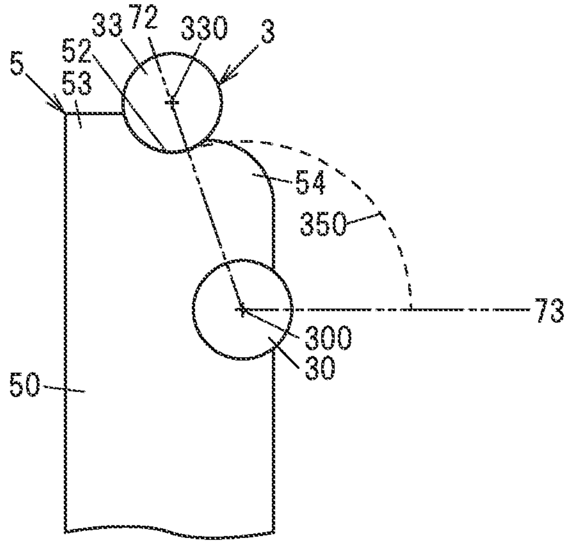
FIG. 5C is an explanatory diagram illustrating an example of the placing surface in a modification.

FIG. 1A is a diagram illustrating an example of the inside of a vehicle in which an operation device in an embodiment is arranged, FIG. 1B is an example top view showing the operation device, and FIG. 1C is an example side view showing the operation device. FIG. 2A is an example block diagram illustrating the operation device in the embodiment, and FIGS. 2B and 2C are explanatory diagrams illustrating an example of an action to lessen tilt movement of an operating portion by a stabilizer. FIG. 3A is a diagram illustrating an example of the stabilizer of the operation device in the embodiment, and FIG. 3B is a diagram illustrating an example of a guide portion. FIG. 4A is a diagram illustrating an example of a supporting portion of the operation device in the embodiment, and FIGS. 4B and 4C are diagrams illustrating examples of the supporting portion in modifications. FIG. 5A is a diagram illustrating an example of a placement portion of the operation device in the embodiment, FIG. 5B is an explanatory diagram illustrating an example of a placing surface, and FIG. 5C is an explanatory diagram illustrating an example of the placing surface in a modification.

In each drawing of the embodiment described below, a scale ratio or shape may be different from an actual ratio or shape. In addition, in FIG. 2A, flows of main signal and information are indicated by arrows.

As shown in FIG. 1A, the operation device 1 in the present embodiment is arranged on a floor console 80 located between the driver's seat and the front passenger seat of a vehicle 8, as an example. The operation device 1 is configured, e.g., to operate in-vehicle devices 83 mounted on the vehicle 8. The in-vehicle devices 83 are, as an example, a vehicle control device that controls settings for the entire vehicle and self-driving functions, an air conditioner that adjusts temperature inside the vehicle, a navigation device that shows a map of the current location and guides to a destination, a display device that displays images, a seat device to control position and inclination of seats, and a music and video playback device to play back music and video, etc. The operation device 1 can also operate, e.g., a mobile device, etc., connected to these in-vehicle devices 83 by wire or wirelessly.

As shown in FIGS. 1B to 4A, the operation device 1 generally includes an operating portion 2 to receive a push-in operation, a stabilizer 3 as a lessening member to lessen tilt movement of the operating portion 2 associated with the push-in operation, a supporting portion 4 to support the stabilizer 3, a base portion 12 on which the supporting portion 4 is provided, and at least one placement portion 5 that is provided on the base portion 12, has a placing surface 52 to place an end portion (described later) of the stabilizer 3, and holds the stabilizer 3 on the base portion 12 by the placing surface 52 and the supporting portion 4 in a preparation stage for assembling the operating portion 2 to the base portion 12.

As shown in FIG. 3B, the operation device 1 also includes guide portions 6 that are provided on the operating portion 2 so as to respectively correspond to the left and right end portions of the stabilizer 3, guide the inserted end portions of the stabilizer 3 from an assembly direction (from an arrow A direction) to a direction intersecting the assembly direction (to an arrow B direction) to cause rotation of the stabilizer 3 in the intersecting direction at the time of assembling the operating portion 2 to the base portion 12, and, together with the supporting portion 4, hold the stabilizer 3 after the operating portion 2 is assembled to the base portion 12.

As shown in FIGS. 1C and 2A, the operation device 1 in the present embodiment includes a touch sensor 22 to detect a detection target coming into contact with or proximity to an operating surface 20, a push switch 23 to detect a push-in operation on the operating portion 2, and a control unit 14 that outputs operation information S3 to the in-vehicle devices 83 according to detection by the touch sensor 22 and the push switch 23.

The touch sensor 22 detects an operating position of the detection target using a capacitive sensing method, generates detection information $S_1$, and outputs it to the control unit 14. This detection information $S_1$ includes information of coordinates of the position on the operating surface 20 at which the detection target has been detected, as an example. The detection target is an operating finger of a user, as an example.

The push switch 23 detects a push-in operation on the operating portion 2, i.e., a push operation performed on the operating surface 20, generates a switch signal S2, and outputs it to the control unit 14. The push switch 23 is a microswitch, as an example. The push switch 23 is provided, e.g., on the base portion 12 below at least one of the guide portions 6, and is configured to turn on with movement of said guide portion 6 caused by a push operation.

The control unit 14 is, e.g., a microcomputer composed of a CPU (Central Processing Unit) performing calculation and processing, etc., of the acquired data according to a stored program, and a RAM (Random Access Memory) and a ROM (Read Only Memory) as semiconductor memories, etc.

The control unit 1 can, e.g., move the cursor displayed on the display screen of the in-vehicle device 83 or change setting values, based on a touch operation or tracing operation performed on the operating surface 20. The control unit 1 can also control the in-vehicle devices 83 to execute a selected function, e.g., upon a push operation performed on the operating surface 20.

In other words, the operation device 1 in the present embodiment is configured to detect touch operations, etc. performed on the operating surface 20 by the touch sensor 22 and also detect push operations performed on the operating surface 20.

As a modification, the operation device 1 may be configured as, e.g., a switch that receives only push operations, such as a switch 81 or a start switch 82 shown in FIG. 1A. The switch 81 is, e.g., assigned a function of the in-vehicle device 83 and causes said function to be executed by a received push operation. The start switch 82 can, e.g., drive the driving device of the vehicle 8 or stop the driving device which is operating, based on a received push operation.

Configuration of the Operating Portion 2

As shown in FIGS. 1B and 1C, the operating portion 2 has a plate shape, and the guide portions 6 are provided on its back surface 21 at both end portions in a longitudinal direction. The operating portion 2 is configured to receive touch operations and tracing operations, etc., on the operating surface 20 and also receive push operations on the operating surface 20. Since this operating surface 20 has a rectangular shape which is long in the horizontal direction on the paper of FIG. 1B, sides 201 facing in a lateral direction is longer than sides 202 facing in a longitudinal direction.

The longitudinal direction is a left-right direction on the paper of FIG. 1B. The lateral direction is an up-down direction on the paper of FIG. 1B. Both end portions in the longitudinal direction are end portions near the sides 202 facing each other. The operating surface 20 may have a square shape. In this case, the stabilizers 3 are arranged along the up-down direction and the left-right direction, as an example.

The operating portion 2 has the touch sensor 22 at the top. The front surface of the operating portion 2 is the operating surface 20 of the touch sensor 22.

The operating portion 2 is attached to a housing 10. As shown in FIG. 1C, the housing 10 is composed of an upper housing 11 and the base portion 12, as an example. The upper housing 11 has an opening 110 in which the operating surface 20 is exposed.

As an example, two supporting portions 4 and two placement portions 5 are provided on an installation surface 120 of the base portion 12. In this regard, it may be configured to include only one of the placement portions 5. The upper housing 11 is attached to the base portion 12 by screws, etc. The upper housing 11 and the base portion 12 are formed using, e.g., a resin material.

Configuration of the Stabilizer 3

As shown in FIG. 3A, the stabilizer 3 is formed using a metal material and has a long bar shape. The stabilizer 3 includes a supported portion 30 supported by the supporting portions 4, first and second bent portions 31 and 32 formed by bending from both ends of the supported portion 30 in an opposite direction where the bend portions are opposed to each other, and first and second end portions 33 and 34 as the end portions bent from ends of the first and second bent portions 31 and 32 in directions away from each other.

As shown in FIG. 3A, the supported portion 30 has a linear shape. The supported portion 30, when attached to the base portion 12, is in contact with lower surfaces 42 of protruding portions 41 (described later) of the supporting portions 4.

The first bent portion 31 is located on the left side on the paper of FIG. 3A and is formed by upwardly bending from the supported portion 30. The first bent portion 31 forms an angle of 90° with the supported portion 30 as an example, but it is not limited thereto.

The second bent portion 32 is located on the right side on the paper of FIG. 3A and is formed by upwardly bending from the supported portion 30. The second bent portion 32 is formed by bending at the same angle as the first bent portion 31 so as to face the first bent portion 31, as an example.

The first end portion 33 is located on the left side on the paper of FIG. 3A and is formed by bending from the first bent portion 31 toward the left. The first end portion 33 forms an angle of 90° with the first bent portion 31 and is parallel to the supported portion 30 as an example, but it is not limited thereto.

The second end portion 34 is located on the right side of the paper of FIG. 3A and is formed by bending from the second bent portion 32 in a direction opposite to the first end portion 33, i.e., toward the right. The second end portion 34 forms an angle of 90° with the second bent portion 32 and is parallel to the supported portion 30 as an example, but it is not limited thereto.

As shown in FIG. 5B, in case that the stabilizer 3 rotates in a first direction 35 about a center 300 of a lateral cross section of the supported portion 30 serving as a center of rotation, the end portion of the stabilizer 3, which is placed on the placing surface 52 in the preparation stage, is supported at a position shifted in a second direction 36, which is opposite to the first direction 35, from the 12 o'clock position with respect to the center of rotation.

In particular, when the placement portion 5 is arranged on the first end portion 33 side of the stabilizer 3 and is viewed from the supported portion 30 side, the first end portion 33 in a state of being placed on the placing surface 52 in the preparation stage is supported in a preparation position 72 rotated in the second direction 36 from a reference line 71 indicating the 12 o'clock position, as shown in FIG. 5B. A dash-dot-dot line shown in FIG. 5B is a straight line connecting the center of the supported portion 30 to the center of the first end portion 33.

When the placement portion 5 is arranged on the second end portion 34 side of the stabilizer 3 and is viewed from the supported portion 30 side, the second end portion 34 in a state of being placed on the placing surface 52 in the preparation stage is supported in the preparation position 72 rotated in the second direction 36 from the reference line 71 indicating the 12 o'clock position. Furthermore, when the placement portions 5 are arranged on the first end portion 33 side and the second end portion 34 side of the stabilizer 3, the first end portion 33 and the second end portion 34 are supported in the preparation position 72 rotated in the second direction 36 in the same manner.

Figure 6A:
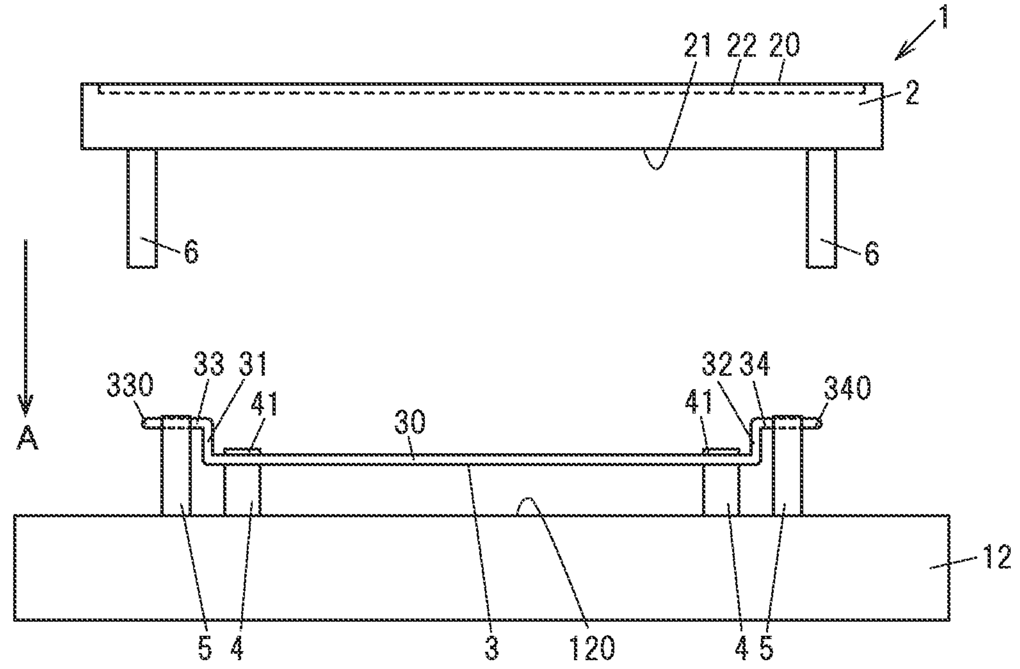
FIG. 6A is a diagram illustrating an example of a preparation stage.
Figure 6B:
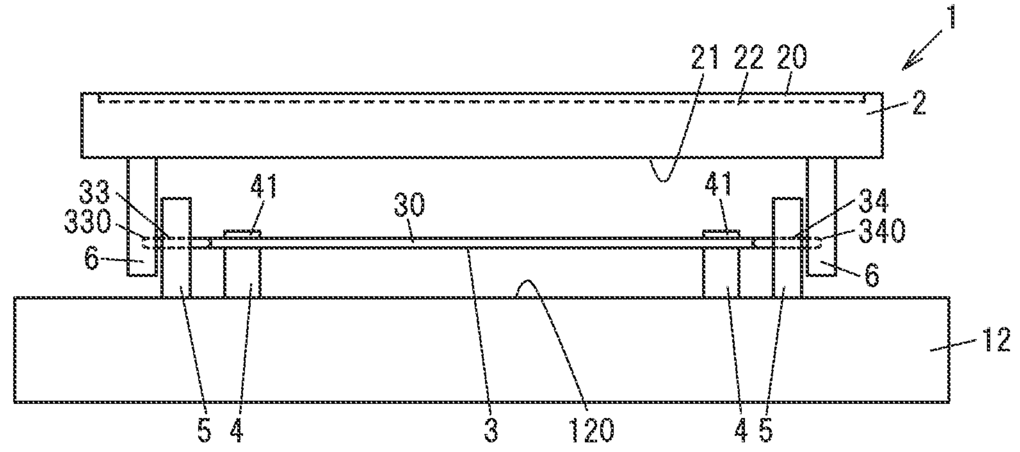
FIG. 6B is a diagram illustrating an example of a state after being assembled.

When setting the operating portion 2 on the base portion 12, the stabilizer 3 rotates in the first direction 35 to an assembled position 73 at which the first and second end portions 33, 34 and the supported portion 30 are substantially in a horizontal plane, as shown in FIG. 6B. At this time, the supported portion 30 rotates in the first direction 35 while being in contact with the supporting portions 4. That is, due to the rotation of the first and second end portions 33 and 34, the entire stabilizer 3 rotates in the first direction 35 about the center 300 serving as the center of rotation.

Configuration of the Supporting Portion 4

As shown in FIG. 4A, the supporting portion 4 has a support base 40 rising from the base portion 12, and the protruding portion 41 that protrudes in a direction opposite to the intersecting direction (an intersecting direction B) in which the stabilizer 3 rotates at the time of assembling the operating portion 2 to the base portion 12.

The support base 40 is formed using, e.g., a resin material and has a plate shape. The protruding portion 41 protrudes from a side surface 400 of the support base 40 and suppresses upward movement of the supported portion 30. The stabilizer 3 rotates in the first and second directions 35 and 36 while keeping contact with the side surface 400 and the lower surface 42. As a modification, the lower surface 42 of the protruding portion 41 may be a recessed surface corresponding to the shape of the supported portion 30.

As shown in FIGS. 2B and 2C, the supporting portions 4 are provided on the base portion 12 on the left and right in the longitudinal direction so as to correspond to the guide portions 6 of the operating portion 2, as an example. The supporting portions 4 support rotation of the stabilizer 3 and thus are arranged close to the first and second bent portions 31 and 32.

As a modification, a recessed portion to rotatably fit the stabilizer 3 may be provided on the lower surface 42 of the supporting portion 4. In addition, it may be configured to include one supporting portion 4 to support the center of the supported portion 30, instead of having plural supporting portions 4.

As another modification, the supporting portion 4 may further include a projecting portion 43 projecting from the side surface 400 below the protruding portion 41, and a recessed portion 44 provided between the protruding portion 41 and the projecting portion 43, as shown in FIG. 4B. This recessed portion 44 supports the inserted supported portion 30 of the stabilizer 3 and suppresses movement of the supported portion 30 in the up-down direction. Alternatively, the supporting portion 4 may be configured to have the recessed portion 44 on the side surface 400 of the support base 40.

As yet another modification, the supporting portion 4 may be configured to have a first supporting portion 4*a* and a second supporting portion 4*b*, as shown in FIG. 4C. The first supporting portion 4*a* is the same as the supporting portion 4 in the embodiment. The second supporting portion 4*b* has an upper surface 45 that supports the supported portion 30 of the stabilizer 3 and suppresses downward movement of the supported portion 30. The stabilizer 3 is held by the first supporting portion 4*a* and the second supporting portion 4*b*.

Configuration of the Placement Portion 5

As shown in FIGS. 2B and 2C, two placement portions 5 are arranged on the installation surface 120 of the base portion 12 so as to be each located between the supporting portion 4 and the guide portion 6, as an example. The placement portion 5 is formed using, e.g., a resin material and has a plate shape. This placement portion 5 is configured such that an upper surface of a placement base 50 serves as the placing surface 52. The placing surface 52 has a recessed surface which is located on a raised portion 53 (described later) side and corresponds to the shape of the stabilizer 3.

As shown in FIG. 5A, the placement portion 5 has the raised portion 53 at an end of the placing surface 52 to inhibit the stabilizer 3 placed on the placing surface 52 from rotating in the second direction 36. As shown in FIG. 5B, the stabilizer 3 in a state of being placed on the placing surface 52 is inhibited from rotating in the second direction 36 since the raised portion 53 becomes a wall obstructing rotation of the first end portion 33 in the second direction 36.

In addition, as shown in FIGS. 5A and 5B, the placement portion 5 is configured such that a corner 54 on a side in the first direction 35 has a curved surface such that rotation of the stabilizer 3 is not inhibited. If the corner 54 does not have a curved surface, a trajectory 350 of a lowest point 332 of the stabilizer 3 when rotating in the first direction 35 may intersect the non-curved corner 54, making it difficult to assemble the operating portion 2 to the base portion 12. The lowest point 332 is a contact point of the first end portion 33 with the placing surface 52.

A distance $H_1$ from a highest point 301 of the supported portion 30 to the lowest point 332 of the first end portion 33 of the stabilizer 3 is not less than a distance $H_3$ from the lower surface 42 of the protruding portion 41 in contact with the stabilizer 3 to the placing surface 52. Likewise, a distance $H_2$ from the highest point 301 of the supported portion 30 to a lowest point 341 of the second end portion 34 of the stabilizer 3 is not less than the distance $H_3$ from the lower surface 42 of the protruding portion 41 in contact with the stabilizer 3 to the placing surface 52. The distance $H_1$ is equal to the distance $H_2$.

In the present embodiment, the distance $H_1$ from the highest point 301 of the supported portion 30 to the lowest point 332 of the end portion is equal to the distance $H_3$. That is, the stabilizer 3 when placed on the placing surface 52 is not elastically deformed with no change in a distance L between the center 300 of the supported portion 30 and a center 331 of the first end portion 33, and thus easily rotates in the first and second directions 35 and 36.

As a modification, the placing surface 52 may have a recessed shape corresponding to the shape of the stabilizer 3, as shown in FIG. 5C. In this case, the placing surface 52 has a position higher than the trajectory 350 of the lowest point 332 of the first end portion 33. Therefore, the stabilizer 3 is elastically deformed when placed on the placing surface 52, and is then supported and stabilized.

As yet another modification, the placement portion 5 does not need to have a curved surface at the corner 54 as long as the end portion does not come into contact with the corner 54.

As shown in FIGS. 2B and 2C, when the first end portion 33 and the second end portion 34 of the stabilizer 3 are placed on the placing surfaces 52, an endmost portion 330 of the first end portion 33 and an endmost portion 340 of the second end portion 34 are exposed on the outside of the placing surfaces 52. The endmost portions 330 and 340 are inserted into the guide portions 6.

Configuration of the Guide Portion 6

As shown in FIGS. 2B and 2C, the guide portions 6 are arranged so as to face in the longitudinal direction of the operating portion 2. The guide portion 6 is formed using, e.g., a resin material and has a plate shape.

The guide portions 6 may be formed integrally with the operating portion 2 or may be attached to the operating portion 2 by screws, etc. Since the left and right guide portions 6 have the same configuration, the guide portion 6 to which the first end portion 33 of the stabilizer 3 is attached will be described.

As shown in FIG. 3B, the guide portion 6 has an insertion groove 60 to insert the end portion of the stabilizer 3 at the time of assembling the operating portion 2 to the base portion 12, an inclined groove 61 having an inclined surface 610 inclined from the insertion groove 60, and an intersecting groove 62 that extends in a direction intersecting the insertion groove 60 (the intersecting direction B) and is connected to the inclined groove 61. The insertion groove 60, the inclined groove 61 and the intersecting groove 62 are not limited to those having a groove shape and may be configured as through-holes.

The insertion groove 60 is a linear groove which is provided in the up-down direction on the paper of FIG. 3B and into which the endmost portion 330 of the stabilizer 3 is inserted at the time of assembling the operating portion 2 to the base portion 12.

The inclined groove 61 is inclined with respect to an assembly direction A on the paper of FIG. 3B and comes into contact with the inserted endmost portion 330 of the stabilizer 3 to cause the stabilizer 3 to move in the intersecting direction B, i.e., to rotate in the first direction 35.

The intersecting groove 62 is a groove that extends in the left-right direction on the paper of FIG. 3B. The endmost portion 330 of the inserted stabilizer 3 is held by the intersecting groove 62. The endmost portion 340 is held by the intersecting groove 62 of the guide portion 6 on the second end portion 34 side.

Lessening of Tilt Movement of the Operating Portion 2

The operating surface 20 of the operation device 1 has a rectangular shape in which a length in the left-right direction is larger than a length in the up-down direction on the paper of FIG. 1B. Even if the operating portion 2 is push-operated at a position that is off-center on the up, down, left, or right side, tilt movement of the operating portion 2 is small as long as the position is close to a center 200 of the operating surface 20.

However, when, as an example, a push operation is performed on a left end portion of the operating surface 20 on the paper of FIG. 2B, this end portion moves downward and the operating portion 2 moves while tilting. When moving while tilting, and in case that the push switch 23 is arranged below the guide portion 6 located at an end portion opposite to said end portion, it is difficult to detect the push operation.

When a push operation is performed on said end portion, an upper surface 620 of the intersecting groove 62 of the guide portion 6 presses the first end portion 33 due to a load $F_1$ generated by a push operation of an operating finger 9 as shown in FIG. 2B and the stabilizer 3 moves downward. Since this movement causes the stabilizer 3 to twist, the second end portion 34 moves downward so as to follow the first end portion 33 due to an elastic force $F_2$ generated by this twist. In other words, the stabilizer 3 rotates in the first direction 35 following the first end portion 33. Thus, movement of the operating portion 2 is free from tilt, as shown in FIG. 2C.

Assembly

FIG. 6A is a diagram illustrating an example of a preparation stage for the operation device in the embodiment, and FIG. 6B is a diagram illustrating an example after assembling the operating portion to the supporting portion. FIGS. 7A to 7F are explanatory diagrams illustrating an example of movement of the stabilizer of the operation device in the embodiment during assembling the operating portion to the supporting portion.

In the preparation stage, as shown in FIG. 6A, the first end portion 33 and the second end portion 34 are placed on the placing surfaces 52 of the left and right placement portions 5 by rotating the stabilizer 3 in the second direction 36 while keeping contact between the supported portion 30 of the stabilizer 3 with the lower surfaces 42 and the side surfaces 400 of the protruding portions 41 of the supporting portions 4, thereby setting the stabilizer 3 on the base portion 12.

Next, to assemble the operating portion 2 to the base portion 12, the first end portion 33 is aligned with the insertion groove 60 of the left guide portion 6 and the second end portion 34 with the insertion groove 60 of the right guide portion 6, and the operating portion 2 is then moved in the assembly direction A. In the following description, the movement of the endmost portion 330 of the first end portion 33 will be mainly described.

Figure 7A:
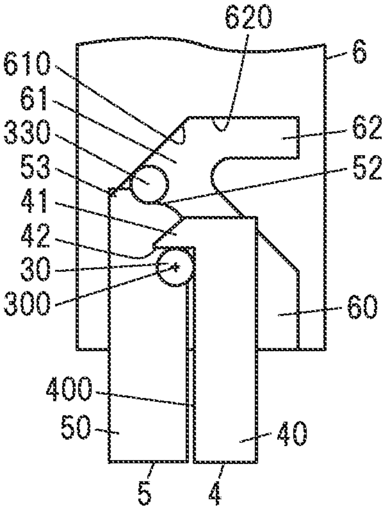
FIGS. 7A to 7F are explanatory diagrams illustrating an example of movement of the stabilizer during assembling an operating portion to the supporting portion.

As shown in FIG. 7A, the endmost portion 330 comes into contact with the inclined surface 610 of the inclined groove 61 after being inserted into the insertion groove 60.

Figure 7D:
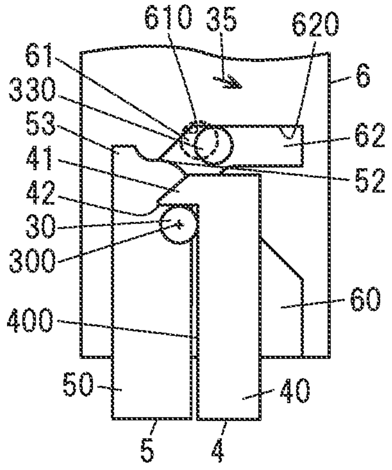
Figure 7B:
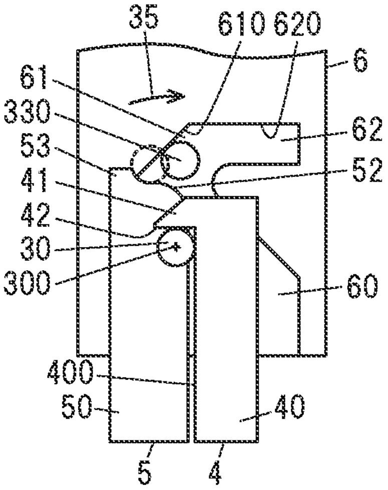

Then, when the operating portion 2 is further moved in the assembly direction A, the endmost portion 330 is pressed by the inclined surface 610 as shown in FIG. 7B and the supported portion 30 and the first end portion 33 rotate in the first direction 35. In other words, the stabilizer 3 rotates in the first direction 35. This rotation causes the first and second end portions 33 and 34 to move away from the placing surfaces 52.

Figure 7E:
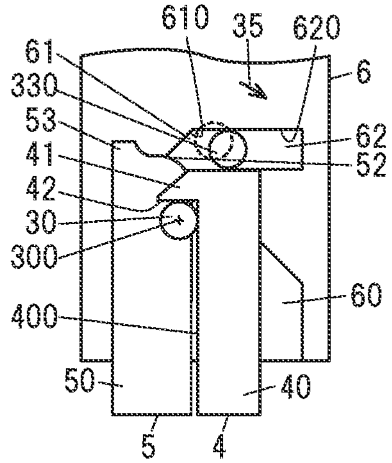
Figure 7C:
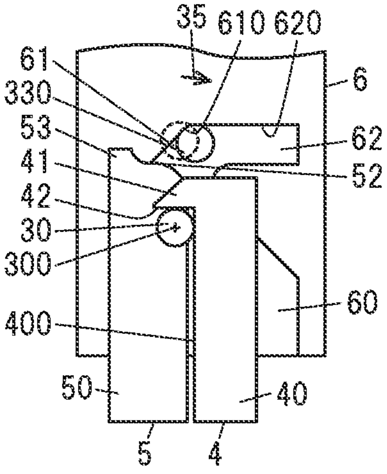

Then, when the operating portion 2 is further moved in the assembly direction A, the endmost portion 330 is pressed by the inclined surface 610 and moves to a position where the endmost portion 330 is in contact with the inclined surface 610 as well as the upper surface 620 of the intersecting groove 62, as shown in FIG. 7C. The stabilizer 3 further rotates in the first direction 35.

Then, when the operating portion 2 is further moved in the assembly direction A, the endmost portion 330 is pressed by the upper surface 620 and moves in the intersecting groove 62 toward the right, i.e., in the intersecting direction B, as shown in FIG. 7D. The stabilizer 3 further rotates in the first direction 35.

Then, when the operating portion 2 is further moved in the assembly direction A, the endmost portion 330 is further pressed by the upper surface 620 and moves in the intersecting groove 62 in the intersecting direction B, as shown in FIG. 7E. The stabilizer 3 further rotates in the first direction 35.

Figure 7F:
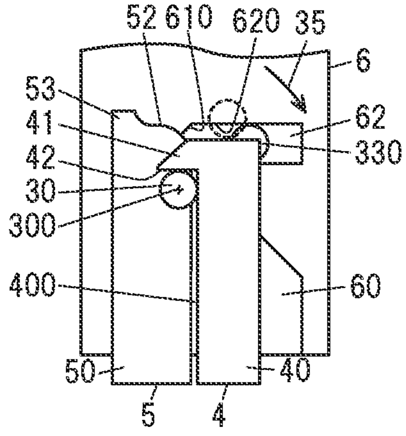

Then, when the operating portion 2 is further moved in the assembly direction A, the endmost portion 330 is further pressed by the upper surface 620, moves in the intersecting groove 62 in the intersecting direction B, and reaches the assembled position 73 as shown in FIG. 7F, and the assembly is thereby completed.

Effects of the Embodiment

The operation device 1 in the present embodiment is easy to assemble. In particular, since the stabilizer 3 can be set on the base portion 12 by means of the placing surfaces 52 of the placement portions 5 and the supporting portions 4 without having to hold the stabilizer 3 by a jig prior to assembly, the operation device 1 is easier to assemble than when using a jig.

By rotating the stabilizer 3 in the second direction 36 while keeping contact between the stabilizer 3 with the lower surfaces 42 and the side surfaces 400 of the supporting portions 4 and thereby placing the first end portion 33 and the second end portion 34 on the placing surfaces 52, the stabilizer 3 can be set on the supporting portions 4. Therefore, the operation device 1 does not require a process using a jig and the manufacturing cost can thus be reduced. In addition, since the stabilizer 3 can be easily set on the base portion 12, the operation device 1 can be easily assembled by hand.

By moving the operating portion 2 in the assembly direction A relative to the base portion 12 after setting the stabilizer 3 on the base portion 12, the stabilizer 3 is guided by the guide portions 6 and set in the assembled position 73. Therefore, the operation device 1 can be assembled easily as compared to when such a configuration is not adopted.

When assembling the operation device 1, the stabilizer 3 can be easily set on the base portion 12 and the operating portion 2 can also be easily assembled to the base portion 12. Therefore, it is possible to suppress the use of tools, such as jig, or machine, and thereby suppress the manufacturing cost. In addition, since the stabilizer 3 can be easily set on the base portion 12 and the operating portion 2 can also be easily assembled to the base portion 12, automated machine assembly of the operation device 1 without using jigs is facilitated.

In the operation device 1, the preparation position 72 of the first end portion 33 of the stabilizer 3 is a position rotated in the second direction 36 from the reference line 71. Therefore, as compared to when such a configuration is not adopted, it is possible to make it difficult for the stabilizer 3 to come off from the base portion 12 without applying an elastic force for holding the stabilizer 3, and it is also easy to rotate the stabilizer 3, facilitating assembly.

In the operation device 1, the distance $H_1$ from the highest point 301 of the supported portion 30 to the lowest point 332 of the first end portion 33 of the stabilizer 3 is not less than the distance $H_3$ from the lower surface 42 of the protruding portion 41 to the placing surface 52. Therefore, it is easier to set the stabilizer 3 as compared to when such a configuration is not adopted.

Since the operation device 1 does not require a jig to support the stabilizer 3 from below, the base portion 12 does not need to have an opening for the jig, which improves the degree of freedom in design.

Although some embodiment and modifications of the invention have been described, these embodiment and modifications are merely examples and the invention according to claims is not to be limited thereto. These new embodiment and modifications may be implemented in various other forms, and various omissions, substitutions and changes, etc., can be made without departing from the gist of the invention. In addition, not all combinations of the features described in these embodiment and modifications are necessary to solve the problem of the invention. Further, these embodiment and modifications are included within the scope and gist of the invention and also within the invention described in the claims and the range of equivalency.

REFERENCE SIGNS LIST

1 OPERATION DEVICE
2 OPERATING PORTION
3 STABILIZER
4 SUPPORTING PORTION
5 PLACEMENT PORTION
6 GUIDE PORTION
12 BASE PORTION
30 SUPPORTED PORTION
31 FIRST BENT PORTION
32 SECOND BENT PORTION
33 FIRST END PORTION
34 SECOND END PORTION
35 FIRST DIRECTION
36 SECOND DIRECTION
40 SUPPORT BASE
41 PROTRUDING PORTION
42 LOWER SURFACE
52 PLACING SURFACE
53 RAISED PORTION
54 CORNER
60 INSERTION GROOVE
61 INCLINED GROOVE
62 INTERSECTING GROOVE
610 INCLINED SURFACE

The invention claimed is:

1. An operation device, comprising:
an operating portion to receive a push-in operation;
a lessening member to lessen tilt movement of the operating portion associated with the push-in operation;
a supporting portion to support the lessening member;
a base portion on which the supporting portion is provided;
at least one placement portion that is provided on the base portion, comprises a placing surface to place an end portion of the lessening member, and holds the lessening member on the base portion by the placing surface and the supporting portion in a preparation stage for assembling the operating portion to the base portion, and
guide portions that are provided on the operating portion so as to respectively correspond to left and right end portions of the lessening member, guide the inserted end portions of the lessening member from an assembly direction to a direction intersecting the assembly direction to cause rotation of the lessening member in the intersecting direction at the time of assembling the operating portion to the base portion, and, together with the supporting portion, hold the lessening member after the operating portion is assembled to the base portion,
wherein the guide portions each comprise an insertion groove to insert the end portion of the lessening member at the time of assembling the operating portion to the base portion, an inclined groove comprising an inclined surface inclined from the insertion groove, and an intersecting groove that axially extends in one direction intersecting the insertion groove and is connected to the inclined groove.

2. The operation device according to claim 1, wherein the placement portion comprises a curved surface so as not to inhibit a rotation of the lessening member, where the lessening member rotates about a center of a lateral cross section of the supported portion serving as a center of rotation.

3. The operation device according to claim 1, wherein the lessening member has a long bar shape, and comprises a supported portion supported by the supporting portion, first and second bent portions formed by bending from both ends of the supported portion in an opposite direction, and first and second end portions as the end portions bent from ends of the first and second bent portions in directions away from each other.

4. The operation device according to claim 3, wherein the first and second bent portions of the lessening member are each disposed between the supporting portion and the placement portion in a longitudinal direction of the lessening member.

5. The operation device according to claim 3, wherein the supporting portion, the placement portion and each of the guide portions are disposed in the order of the supporting portion, the placement portion and each of the guide portions in a direction from a center of the lessening member in a longitudinal direction thereof toward the first or second end portion.

6. The operation device according to claim 3, wherein where the lessening member rotates in a first direction about a center of a lateral cross section of the supported portion serving as a center of rotation, the end portion of the lessening member, which is placed on the placing surface in the preparation stage, is supported at a position shifted in a second direction, which is opposite to the first direction, from a 12 o'clock position with respect to the center of rotation.

7. The operation device according to claim 6, wherein the placement portion comprises a raised portion at an end of the placing surface to inhibit the lessening member placed on the placing surface from rotating in the second direction.

8. The operation device according to claim 7, wherein the supporting portion comprises a support base rising from the base portion, and a protruding portion that protrudes in a direction opposite to the intersecting direction in which the lessening member rotates at the time of assembling the operating portion to the base portion, and wherein a distance from a highest point of the supported portion to a lowest point of the end portion of the lessening member is not less than a distance from a lower surface of the protruding portion in contact with the lessening member to the placing surface.

* * * * *